Reissued Apr. 26, 1932

Re. 18,437

UNITED STATES PATENT OFFICE

UGO PESTALOZZA, OF MILAN, ITALY, ASSIGNOR TO SOCIETA ITALIANA PIRELLI, OF MILAN, ITALY

MANUFACTURE OF RUBBER ARTICLES

No Drawing. Original No. 1,717,248, dated June 11, 1929, Serial No. 204,421, filed July 8, 1927, and in Italy January 31, 1927. Application for reissue filed June 11, 1931. Serial No. 543,729.

The present invention relates to certain new and useful improvements in the treatment of coagulable aqueous dispersions of rubber, such for example, as rubber latex in its natural or concentrated condition, with the object of causing their thickening and coagulation under given physical conditions so as to enable the rapid and sure manufacture of a great variety of rubber articles.

It is a well known fact that natural or preserved rubber latex, both diluted and concentrated, behaves in different manners when treated with different chemical substances, organic or inorganic: some of which do not alter appreciably the physical features of the latex; others on the contrary, either immediately or after a certain time, give rise to the coagulation of the particles of rubber in suspension in the latex.

Naturally among the latter chemical substances are chosen those which are used or have been proposed for coagulating the rubber from the latex.

In order to obtain said coagulation, it is however necessary that the concentration of the coagulating substance in relation to the latex be maintained above a certain minimum value. If lower concentrations are used it is possible, by adding to the latex substances apt to preserve it, to prevent the latex, when left to itself, from being subjected to alterations: the latex can simply thicken without coagulating even with a prolonged storage in a suitable place and under suitable conditions.

Hereafter is described, by way of illustration, the behaviour of salts of bi- and trivalent metals, because lately the use of the same has been suggested repeatedly both as coagulating and as thickening agents for latex, with the object either of coagulating the rubber from the latex by adding to its said salts, diluted or in suspension in water, or else of converting the latex into a mass flowing less readily and consequently better suited for the purpose in view. It is a known fact that such compounds, whether dissolved or simply held in suspension in water, when added to the latex can produce coagulation, or, when added in less quantity, can thicken the same in proportion to the concentration of the compound with regard to the latex.

But such salts, like many other materials, have another action upon latex which was altogether ignored heretofore and which forms the chief feature of the present invention.

If said salts are added to latex in very small proportions, for instance in the ratio of about 3 grams of calcium sulphate dissolved or held in suspension in water for 1000 grams of dry residuum of latex and the treatment is carried on at a temperature lower than about 20° C., it does not cause coagulation, the thickening is slight and the latex may be preserved unaltered at said temperature or at a lower temperature for an indefinite time.

If on the contrary the latex so treated be warmed to a temperature above the limit now stated, but below the boiling temperature of the latex, the thickening increases with the temperature and with the time this temperature is applied, up to complete coagulation.

Naturally the higher the temperature, the greater will be the thickening and the quicker will be the coagulation. Coagulation is very rapid at temperatures above 75–80° C. and almost instantaneous at such temperatures when the latex is slightly shaken.

The coagulum obtained when the mass is not shaken, can have a very slight consistency, appearing as a suspension of very minute particles in the aqueous phase or can be compact and resisting notwithstanding its enclosing all the serum.

The one or the other case may occur according to the compound or compounds added (it is obvious that mixtures of salts of bi- or trivalent metals can be used) or the same or of any one of them can be added to the rubber latex together or separately, with gasoline or other chemical bodies whose presence can have the object of promoting or controlling the thickening process or the coagulation.

The addition of such bodies can be easily obtained when the same are dissolved or held in suspension in water or in any other solvent, chosen according to the special properties of said bodies. It is advisable that the solvent contain one of the chemicals usually employed for preserving the latex, for instance ammonia.

The latex ought also to contain a preserving agent; it can have its original rubber content or be concentrated; it can contain in solution or in suspension vulcanizing agents, colouring matter or fillers, as, for applying the process here described, it is sufficient that it be stable in the conditions under which the above stated substances are added, and that between these substances and any others that may have been previously added to the latex, no chemical reaction should take place that may cause an untimely coagulation.

Confining the example to the description of the behaviour of salts of bi- or trivalent metals, it may here be stated that quantities not greater than 1.5 grams of a soluble or slightly soluble salt of calcium and 1 gram of zinc-oxide, in suspension in a few cubic centimeters of ammonia added, stirring all the time, to 1000 grams of latex preserved with ammonia and containing 50% of rubber, or else quantities not greater than 1.5 grams of calcium salt by suspension in a few cubic centimeters of ammonia water added while stirring, to 1100 grams of latex having 50% of rubber preserved with ammonia, and containing 100 grams of benzole or of gasoline, cause a light thickening, when the addition of said chemicals and the preserving of the latex are carried out at a temperature lower than 20° C., but are sufficient to cause a very rapid thickening and coagulation when the latex is brought for a sufficient time to a higher temperature, under 100° C., a few minutes being sufficient, for instance, to obtain coagulation at about 95–97° C.

There are many organic or inorganic bodies which have a similar behaviour.

While I have here described the behaviour of a given class of bodies, such description is by no means to be understood as indicating that the same procedure cannot be extended to other bodies, of however different chemical constitution, the object of said description being purely to examine the action of the bodies mentioned on latex with regard to their thickening and coagulating properties.

Having thus described the preliminary treatment which the dispersion has to undergo, a few illustrations will now be given, describing some processes of manufacturing rubber articles, and some possible applications due to the special features and properties acquired by aqueous rubber dispersions when treated according to this invention.

Some of the articles (for instance teats, bulbs for dropper tubes, surgical gloves, etc.) have heretofore been manufactured by using pure rubber solutions or rubber-scrap solutions in gasoline. Suitable moulds are dipped in these solutions and after having been taken out, the solvent is allowed to evaporate from the solution adhering to the mould; the latter remains covered by a slight layer of rubber. The operation is repeated several times until the desired thickness is obtained, the articles being then finished, vulcanized and stripped from the mould.

It is evident that the expense from gasoline loss, which is large even if special apparatus for recovering the solvent be used, combined with the time required by this process make it a rather costly proposition.

It has been proposed to use, instead of gasoline or benzole solutions, diluted or concentrated rubber latex, following the same process, but notwithstanding its advantages such a method has the drawback of requiring a great length of time for drying the layers of rubber.

Moulds of porous material have also been suggested, which, by partially absorbing the latex serum, allow a thicker layer of rubber to deposit at each dip; but even this process, besides being suitable only for manufacturing thin rubber articles, has many drawbacks which make it rather difficult to apply.

The process hereafter described solves the problem entirely and by using it the manufacture of rubber articles on forms or in moulds is rendered so quick and cheap, that it can be extended to many other articles made at present in other ways.

A suitable form or mould or core or a certain number of the same is hung from a convenient support in such a way as to be uniformly heated: for instance if the moulds are hollow, by circulating hot water through them. Said moulds are dipped in a trough containing natural or concentrated latex, with or without vulcanizing agents, colouring matter or fillers, prepared as described above and preserved at such a low temperature as to prevent coagulation. After heating the moulds as above stated at a proper temperature and keeping them in the bath for a convenient length of time, they are taken out covered with a layer of thickened latex adhering to them, which layer rapidly coagulates and, after having been dried, becomes a rubber layer whose thickness depends on the temperature of the mould and on the length of time of the dip.

If for instance water at 95° C. is used to heat the mould or core, layers of dry rubber some millimeters thick can be obtained with a dip lasting not more than 5 minutes.

Once the layer of thickened latex is coagulated, if desired or if necessary for further operations, the moulds or cores can be dipped in lukewarm or cold water, with the object of washing away from the coagulated rubber all soluble matter: the articles thus formed on the moulds or cores can be thoroughly or only partially dried, and once finished can be stripped or not from the moulds and subsequently vulcanized according to the latex composition.

The surface of the articles thus manufactured is smooth and the thickness more uniform than those obtained from gasoline solutions of rubber.

This process of local coagulation through local heating of the wall upon which the layer of rubber is to be deposited, is entirely new and constitutes the outstanding principle of the present invention.

The manufacture of inner tubes for tires, tubing, etc. can be carried out in this way; and in such case a core is used whose outer diameter is equal to the inside diameter of the tube to be obtained and which can anyhow be conveniently heated. It can be dipped in the latex, heated and taken out after the layer of coagulum has formed on it, or else, after having been brought to a proper temperature, it can be shifted along in the bath of latex with a continuous motion. The tube so formed can then be treated as above described.

If the article to be manufactured cannot be formed on a core or mandrel, the process can be modified as follows: The mould whose inside surface has the form and dimensions of the article to be obtained, is made of several built-up pieces so as to form a cavity with an opening, which cavity is filled with latex having undergone the treatment described above, and the mould is then uniformly heated from the outside to the required temperature and for the time required to obtain the thickness of rubber wanted.

The fluid latex is then poured out and air, which may be heated, is blown into the cavity of the mould, which latter after a certain time can be allowed to collapse leaving the article ready for further treatment.

By the same process it is possible to manufacture rubber sheets by bringing in contact, by any appropriate means, a heated surface with the latex prepared as above described, and if the surface be a cylinder partially dipped in the latex for its whole length and revolving continuously, the layer of coagulated rubber can be detached as soon as it comes out of the latex, thus obtaining a continuous strip of rubber whose thickness depends on the temperature of the surface of the cylinder and on its speed.

If a fabric or a set of threads, yarns, cords or ribbons, be made to move along the heated metallic surface in the latex, at a proper speed, a very simple and convenient method of waterproofing or rubberizing fabrics can be developed.

Another interesting application of the properties gained by latex after the above described treatment, is the manufacture of articles such as threads, cords, small tubes, etc., heretofore prepared by other long and costly methods.

It has already been proposed to manufacture these articles from rubber latex, natural or concentrated, by letting it flow into a medium having a high coagulating action. The very rapid coagulation of the stream of latex flowing out of a nozzle should allow it to retain the form and dimensions which the latter has at the exit.

Evidently this could only be obtained with articles of a small section and size, as coagulation can take place with the necessary speed only on the superficial layers of the thread so that this method has not found any practical application.

The process here proposed obtains this object in a much better and more practical way.

A trough of latex prepared as above is connected to small pipes or nozzles whose inside section has the form and size of the article wanted.

The pipe can be heated by suitable means to a convenient temperature towards the nozzle end: the latex is forced into the pipes by exerting, for instance, a pressure on the liquid surface of the bath.

The latex, in passing through the heated parts of the pipe, coagulates, maintaining the form and internal size of the nozzle, and is extruded continuously by the same pressure that forces it into the pipes and being sufficiently consistent, can be collected for further treatment.

If in the inside of each pipe be placed another closed pipe fixed to it in such a way as to leave an annular section at the nozzle, the coagulum will be expelled in tubular form.

Hereabove have been described, as examples, a few ways of manufacturing various articles which illustrate some applications of the properties of latex after the treatment described: obviously any other process which, by means of any mechanical device or physical apparatus, can be used to manufacture rubber articles or to rubberize fabrics, or which can be used for any particular object in the treatment of rubber dispersions as described above, according to which the dispersions, pre-rendered heat-unstable towards coagulation, are subjected to local heating to the coagulation temperature through the same surface upon which the coagulated rubber is to be deposited, is to be considered within the limits of the present invention.

It will be appreciated from the foregoing description that the invention may be applied to the direct manufacture of rubber objects in a great variety of ways, by, for instance, internal or external moulding, whether such moulding be conducted statically, as by the simple procedure of dipping a heated shape into the prepared dispersion and by introducing the prepared dispersion into the interior of a shape, or by causing a heated surface to travel through the dispersion, or conversely by causing the prepared dispersion to flow over a heated surface; and the term "forming element" used in the claims is to be understood as comprising the various devices which may be employed for locally heating the prepared dispersion for the production of various types of rubber articles. The expression "forming element" therefore comprises internal and external moulds as ordinarily understood, as well as devices which confer but a temporary shape upon the article, such as the rotating cylinder above described, and nozzles and like means in their diverse forms employed for extrusion.

What I claim as my invention is:

1. A process of manufacturing rubber articles which comprises subjecting a coagulable aqueous rubber dispersion containing such an amount of coagulating agent as will coagulate the dispersion solely at raised temperature to local heating to the coagulation temperature of the dispersion at the surface whereat the rubber is to be formed so as to produce upon that surface a layer of compact coagulated rubber.

2. A process of manufacturing rubber articles which comprises subjecting a coagulable aqueous rubber dispersion containing zinc oxide and such an amount of coagulating agent as will coagulate the dispersion solely at raised temperature to local heating to the coagulation temperature of the dispersion at the surface whereat the rubber is to be formed so as to produce upon that surface a layer of compact coagulated rubber.

3. A process of manufacturing rubber articles which comprises subjecting a coagulable aqueous rubber dispersion containing vulcanizing ingredients and such an amount of coagulating agent as will coagulate the dispersion solely at raised temperature to local heating to the coagulation temperature of the dispersion at the surface whereat the rubber is to be formed so as to produce upon that surface a layer of compact coagulated rubber.

4. A process of manufacturing rubber articles which comprises subjecting a coagulable aqueous rubber dispersion containing such an amount of an inorganic coagulating agent as will coagulate the dispersion solely at raised temperature to local heating to the coagulation temperature of the dispersion at the surface whereat the rubber is to be formed so as to produce upon that surface a layer of compact coagulated rubber.

5. A process of manufacturing rubber articles which comprises subjecting a coagulable aqueous rubber dispersion containing such an amount of coagulating agent as will coagulate the dispersion solely at a temperature substantially between 70°–100° C. to local heating to a temperature within said range at the surface whereat the rubber is to be formed so as to produce upon that surface a layer of compact coagulated rubber.

6. A process of manufacturing rubber articles which comprises subjecting a coagulable aqueous rubber dispersion containing zinc oxide and such an amount of coagulating agent as will coagulate the dispersion solely at a temperature substantially between 70°–100° C. to local heating to a temperature within said range at the surface whereat the rubber is to be formed so as to produce upon that surface a layer of compact coagulated rubber.

7. A process of manufacturing rubber articles which comprises subjecting a coagulable aqueous rubber dispersion containing such an amount of an inorganic coagulating agent as will coagulate the dispersion solely at a temperature substantially between 70°–100° C. to local heating to a temperature within said range at the surface whereat the rubber is to be formed so as to produce upon that surface a layer of compact coagulated rubber.

8. A process of manufacturing rubber articles which comprises subjecting a coagulable aqueous rubber dispersion containing such an amount of a water soluble salt of a divalent metal as will coagulate the dispersion solely at a temperature substantially between 70°–100° C. to local heating to a temperature within said range at the surface whereat the rubber is to be formed so as to produce upon that surface a layer of compact coagulated rubber.

9. A process of manufacture of rubber articles which comprises bringing into contact a coagulable aqueous rubber dispersion containing such an amount of coagulating agent as will coagulate the dispersion solely at a temperature substantially between 70°–100° C. and a heated forming element heated to a temperature within said range so as to produce upon the surface of the forming element in contact with the dispersion a layer of compact coagulated rubber.

10. A process of manufacturing rubber articles which comprises bringing into contact a coagulable aqueous rubber dispersion containing zinc oxide and such an amount of coagulating agent as will coagulate the dispersion solely at a temperature substantially between 70°–100° C. and a heated forming element heated to a temperature within said range so as to produce upon the surface of the forming element in contact with the dispersion a layer of compact coagulated rubber.

11. A process of manufacturing rubber articles in lengths which comprises extruding a coagulable aqueous dispersion of rubber containing such an amount of coagulating agent as will coagulate the dispersion solely at raised temperature through an extrusion device heated to the coagulation temperature of the dispersion.

12. A process of manufacturing rubber articles from latex, comprising the steps of adding to the latex such an amount of coagulating agent as will coagulate the latex solely at a temperature between 70°–100° C.; bringing the latex into contact with a forming element; heating the latex through the forming element to said temperature to effect coagulation; and drying the coagulated latex.

13. A process of manufacturing rubber articles from latex, comprising the steps of adding to the latex such an amount of coagulating agent as will coagulate the latex solely at a temperature between 70°–100° C.; bringing the latex into contact with a forming element; and heating the latex through the forming element to said temperature to effect coagulation.

14. A process of manufacturing rubber articles from latex, comprising the steps of adding to latex which has previously been subjected to a preserving treatment with ammonia such an amount of coagulating agent as will coagulate the latex solely at a temperature between 70°–100° C.; bringing the latex into contact with a forming element; and heating the latex through the forming element to said temperature to effect coagulation.

15. A process of manufacturing rubber articles from latex, comprising the steps of adding to the latex such an amount of a soluble metal salt as will coagulate the latex solely at a temperature between 70°–100° C.; bringing the latex into contact with a forming element, and heating the latex through the forming element to said temperature to effect coagulation.

16. A process of manufacturing rubber articles from latex, comprising the steps of adding to latex which has previously been subjected to a preserving treatment with ammonia such an amount of a soluble metal salt as will coagulate the latex solely at a temperature between 70°–100° C.; bringing the latex into contact with a forming element; and heating the latex through the forming element to said temperature to effect coagulation.

17. A process of manufacturing rubber articles from latex, comprising the steps of adding to the latex such an amount of coagulating agent as will coagulate the latex solely at a temperature between 70°–100° C.; bringing the latex into contact with a forming element; and heating the latex carried by the forming element to said temperature for a period sufficiently long to obtain a coagulated layer of the desired thickness.

18. A process of manufacturing rubber articles from latex, comprising the steps of adding to the latex such an amount of coagulating agent as will coagulate the latex solely at a temperature between 70°–100° C.; bringing the latex into contact with a forming element; and heating the latex carried by the forming element through the latter to said temperature to effect coagulation.

19. A process of manufacturing rubber articles from latex, comprising the steps of adding to the latex such an amount of coagulating agent as will coagulate the latex solely at a temperature between 70°–100° C.; bringing the latex into contact with a forming element; and heating the latex carried by the forming element through the latter to said temperature for a period sufficiently long to obtain a coagulated layer of the desired thickness.

20. A process of manufacturing rubber articles from latex, comprising the steps of adding to the latex such an amount of a soluble metal salt as will coagulate the latex solely at a temperature between 70°–100° C.; bringing the latex into contact with a forming element; and heating the latex carried by the forming element to said temperature for a period sufficiently long to obtain a coagulated layer of the desired thickness.

21. A process of manufacturing rubber articles from latex, comprising the steps of adding to the latex such an amount of a soluble metal salt as will coagulate the latex solely at a temperature between 70°–100° C.; bringing the latex into contact with a forming element; and heating the latex carried by the forming element through the latter to said temperature for a period sufficiently long to obtain a coagulated layer of the desired thickness.

22. A process of manufacturing rubber articles in lengths from latex comprising the steps of adding to the latex such an amount of coagulating agent as will coagulate the latex solely at a temperature between 70°–100° C. and carrying the latex through an extrusion device heated to within said temperature range.

UGO PESTALOZZA.